(12) United States Patent
Cribbs, III et al.

(10) Patent No.: US 11,353,540 B2
(45) Date of Patent: Jun. 7, 2022

(54) METHOD OF PROCESSING INCOMING SIGNALS RECEIVED AT SPATIALLY-SEPARATED RECEIVERS

(71) Applicant: Raytheon Company, Waltham, MA (US)

(72) Inventors: Henry B. Cribbs, III, Sterling, VA (US); Darrell Young, Falls Church, VA (US)

(73) Assignee: Raytheon Company, Waltham, MA (US)

( * ) Notice: Subject to any disclaimer, the term of this patent is extended or adjusted under 35 U.S.C. 154(b) by 291 days.

(21) Appl. No.: 16/720,898

(22) Filed: Dec. 19, 2019

(65) Prior Publication Data

US 2021/0190897 A1 Jun. 24, 2021

(51) Int. Cl.
| | |
|---|---|
| *G01S 5/06* | (2006.01) |
| *G01S 5/02* | (2010.01) |
| *H04B 7/08* | (2006.01) |

(52) U.S. Cl.
CPC .............. *G01S 5/06* (2013.01); *G01S 5/0221* (2013.01); *H04B 7/0885* (2013.01)

(58) Field of Classification Search
CPC ...... G01S 5/06; G01S 5/0221; G01S 5/02213; G01S 5/02216
USPC ........................................................ 342/378
See application file for complete search history.

(56) References Cited

U.S. PATENT DOCUMENTS

| | | | |
|---|---|---|---|
| 5,276,772 A | 1/1994 | Wang | |
| 6,985,102 B1 | 1/2006 | Horn | |
| 2006/0244661 A1 * | 11/2006 | Orr | G01S 5/0215 |
| | | | 342/465 |
| 2016/0209492 A1 | 7/2016 | Grandin | |
| 2017/0251449 A1 * | 8/2017 | Malik | H04W 64/003 |
| 2018/0310133 A1 * | 10/2018 | Ramasamy | H04W 64/003 |

FOREIGN PATENT DOCUMENTS

| | | | | |
|---|---|---|---|---|
| AU | 2008335252 B2 * | 11/2011 | | G01S 5/06 |
| CA | 2733687 A1 * | 2/2010 | | G01S 5/0221 |
| EP | 3091367 A1 * | 11/2016 | | G01S 13/767 |
| RU | 2693848 C1 * | 7/2019 | | H04B 7/0695 |
| WO | WO-2018214587 A1 * | 11/2018 | | H04W 4/02 |

* cited by examiner

*Primary Examiner* — Harry K Liu
(74) *Attorney, Agent, or Firm* — Renner, Otto, Boisselle & Sklar, LLP

(57) ABSTRACT

A method of processing incoming signals, such as RF signals, includes receiving the incoming RF signals at two (or more) spatially-separated receivers, then processing the signals to determine a phase lag between the two signals. This allows a presumed location of the signal source to be determined, based on the time difference of arrival (TDOA) of signals at the separated receivers. This can be used to produce a phase adjustment of one of the signals, allowing the signals to be coherently summed. The coherently summed combined signal is then examined for instances where a threshold magnitude is exceeded. This information is then used to create a blanking mask, which is then employed as a filter to incoming signals, to blank out non-coherent signals, such as noise and extraneous signals from sources that are not of interest. The blanked signal train is then examined/analyzed for constant pulse repetitions.

19 Claims, 4 Drawing Sheets

METHOD OF PROCESSING INCOMING SIGNALS RECEIVED AT SPATIALLY-SEPARATED RECEIVERS

FIELD OF THE INVENTION

The present application relates to signal processing, and more particularly to methods and apparatus for processing incoming radio frequency (RF) signals, or other signals that possess discernable and/or measurable magnitude and phase.

DESCRIPTION OF THE RELATED ART

It is often desirable to receive and analyze radio frequency (RF) signals emitted by any of a variety of objects, in both military and civilian contexts, for example from missiles, aircraft, and fishing boats using marine navigation radar, to give a few examples. Analysis of the RF signals emitted by sources may allow determination of the actions and/or intentions of the source of the RF signals.

RF signal environments, such as for radar signals, can be dense, with many signals in the environment from a variety of natural and artificial sources. In such noisy signal environments it can be difficult to separate an RF signal from a specific source from the background noise. This can cause difficulties for electronic signals intelligence (ELINT) operations of various sorts.

One approach to analyzing RF signals has been to deinterleave incoming signals. Deinterleaving is typically done as a bulk processing/batch processing approach using statistical measures to form clusters.

There is room for improvement in approaches to analysis of RF signals.

SUMMARY OF THE INVENTION

A method of processing incoming signals includes receiving the incoming signals at collectors at different spatial locations.

A method of processing incoming signals includes geolocating a source of the signals by correlating timing of receipt of the incoming signals at collectors at different locations.

A method of processing incoming signals includes using a blanking mask to limit processing to portions of the incoming signals with a location associated with emission of signals of interest.

According to an aspect of the invention, a method of processing incoming wireless signals that include source signals from a source, includes: receiving the incoming wireless signals at receivers at different spatial locations; correlating timing of receipt of the incoming wireless signals at the receivers; and coherently summing the incoming wireless signals to produce a coherently summed signal, using results of the correlation.

According to an embodiment of any paragraph(s) of this summary, the incoming wireless signals are radio frequency (RF) signals.

According to an embodiment of any paragraph(s) of this summary, the results of the correlation include a time difference of arrival (TDOA) between the incoming signals received at to the receivers.

According to an embodiment of any paragraph(s) of this summary, the coherently summing includes shifting phase of at least one of the incoming signals, using the TDOA.

According to an embodiment of any paragraph(s) of this summary, the method further includes filtering the coherently summed signal.

According to an embodiment of any paragraph(s) of this summary, the filtering includes creating a blanking mask to attenuate portions of the coherently summed signal that are not of interest.

According to an embodiment of any paragraph(s) of this summary, the creating a blanking mask includes comparing portions of the coherently summed with a predetermined threshold magnitude.

According to an embodiment of any paragraph(s) of this summary, the method further includes applying the blanking mask to the signals received at the receivers, to create blanked signals that attenuate portions not of interest.

According to an embodiment of any paragraph(s) of this summary, the method further includes analyzing the blanked signals.

According to an embodiment of any paragraph(s) of this summary, the further analyzing includes deinterleaving the blanked signals to separate signal streams.

According to an embodiment of any paragraph(s) of this summary, the receiving includes receiving the incoming signals, with the receivers spatially separated by at least 1 km.

According to an embodiment of any paragraph(s) of this summary, the receiving includes receiving the incoming signals, with the receivers spatially separated by between 1 km and 250 km.

According to an embodiment of any paragraph(s) of this summary, one of the receivers is on a movable platform.

According to an embodiment of any paragraph(s) of this summary, one of the receivers is on a moving vehicle.

According to an embodiment of any paragraph(s) of this summary, one of the receivers is on a flying vehicle.

According to an embodiment of any paragraph(s) of this summary, the correlating includes applying a complex ambiguity function to the incoming signals.

According to an embodiment of any paragraph(s) of this summary, the method further includes geolocating the source using the incoming signals.

According to another aspect of the invention, an apparatus for processing received signals from a source, includes: a plurality of receivers located at different spatial locations, the plurality of receivers being configured to receive the signals from the source; at least one processor configured to: correlate timing of receipt of the signals at the plurality of receivers; and coherently sum the signals to produce a coherently summed signal based on the results of the correlation.

According to a further aspect of the invention, an apparatus for processing received signals includes: at least one processor configured to: receive signal information from a plurality of receivers located at different spatial locations, the signal information including signals received at the plurality of receivers from a source and timing of receipt of the signals at the plurality of receivers; correlate the timing of receipt of the signals at the plurality of receivers; and coherently sum the signals to produce a coherently summed signal based on the results of the correlation; and a memory coupled to the at least one processor.

According to an embodiment of any paragraph(s) of this summary, the results of the correlation include a time difference of arrival (TDOA) between the signals at the receivers.

According to an embodiment of any paragraph(s) of this summary, the at least one processor is configured to shift phase of at least one of the signals using the TDOA as part of coherently summing the signals.

According to an embodiment of any paragraph(s) of this summary, the at least one processor is further configured to filter the coherently summed signal.

According to an embodiment of any paragraph(s) of this summary, the at least one processor is configured to create a blanking mask to attenuate portions of the coherently summed signal that are not of interest as part of filtering the coherently summed signal.

According to an embodiment of any paragraph(s) of this summary, the at least one processor is further configured to compare portions of the coherently summed with a predetermined threshold magnitude as part of creating the blanking mask.

According to a still further aspect of the invention, an apparatus for processing received signals includes: at least one processor configured to: receive signal information from a plurality of receivers located at different spatial locations, the signal information including signals received at the plurality of receivers from a source and timing of receipt of the signals at the plurality of receivers; correlate the timing of receipt of the signals at the plurality of receivers; and coherently sum the signals to produce a coherently summed signal based on the results of the correlation; and a memory coupled to the at least one processor.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

In accordance with one embodiment, a method of processing incoming wireless signals, such as RF signals, includes receiving the incoming RF signals at two (or more) spatially-separated receivers, then processing the signals to determine a phase lag between the two signals. This allows a presumed location of the signal source to be determined, based on the time difference of arrival (TDOA) of signals at the separated receivers. This can be used to produce a phase adjustment of one of the signals, allowing the signals to be coherently summed. The coherently summed combined signal is then examined for instances where a threshold magnitude is exceeded. This information is then used to create a blanking mask, which is then employed as a filter to incoming signals, to blank out non-coherent signals, such as noise and extraneous signals from sources that are not of interest. The blanked signal train is then examined/analyzed for constant pulse repetitions.

Figure 1:
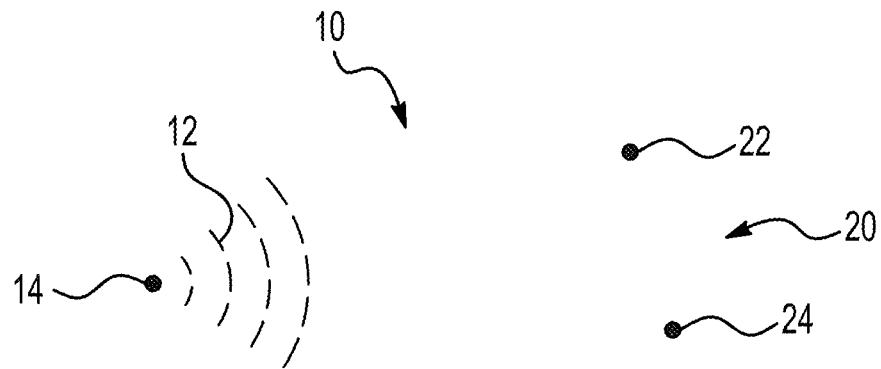
FIG. 1 is a schematic overview of a signal environment, with a receiver system for performing a method according to an embodiment of the invention.

FIG. 1 shows a signal environment 10 in which radio frequency (RF) signals (or other wireless signals) 12 are emitted by a signal source 14. The signal source 14 may be any of a variety of objects/devices/vehicles, such as missiles, manned or unmanned aircraft, spacecraft, a communications device, or ground vehicles or installations. The RF signals may be radar signals or any of a variety of signals, such as communication signals or electronic warfare jamming signals, to give a few non-limiting examples.

For positioning/ranging applications, electronic warfare purposes and/or a variety of other applications, it may be desirable to detect the RF signals 12 and process them to determine more information about the signal source 14. Such information may include not only the location of the signal source 14, put also the type, characteristics, and/or content of the RF signals 12. Such determinations may be made more difficult by operation in a noisy environment in which other signals of different types may be present.

A receiver network or system 20 is used to receive the RF signals 12. In the illustrated embodiment the network 20 includes a pair of spatially-separated receivers 22 and 24, although in practice there may be more than two receivers. The receiver network or system 20 may also be considered to include a processor, not shown in FIG. 1 but described further below, for carrying out operations on (for processing) data, such as signals received by the receivers 22 and 24, and/or signal information based on signals received by the receivers 22 and 24. The receivers 22 and 24 may be stationary, or may be movable. For example the receivers 22 and 24 may be on vehicles (for example, different vehicles), such as land, air, space, flying, or water vehicles.

The spatially-separated receivers 22 and 24 receive the RF signals 12 at different times, out of phase with each other. This difference in phase may be used to geolocate the signal source 14. In addition the phase difference may be employed to process the signals, with the combined signals being filtered to weed out extraneous noise and/or other signals, to allow a better focus on the RF signals 12 from the source 14.

The spacing between the receivers 22 and 24 may take any of a wide variety of values. In non-limiting examples, the receivers 22 and 24 may be spaced apart from 1 km to 250 km.

Figure 2:
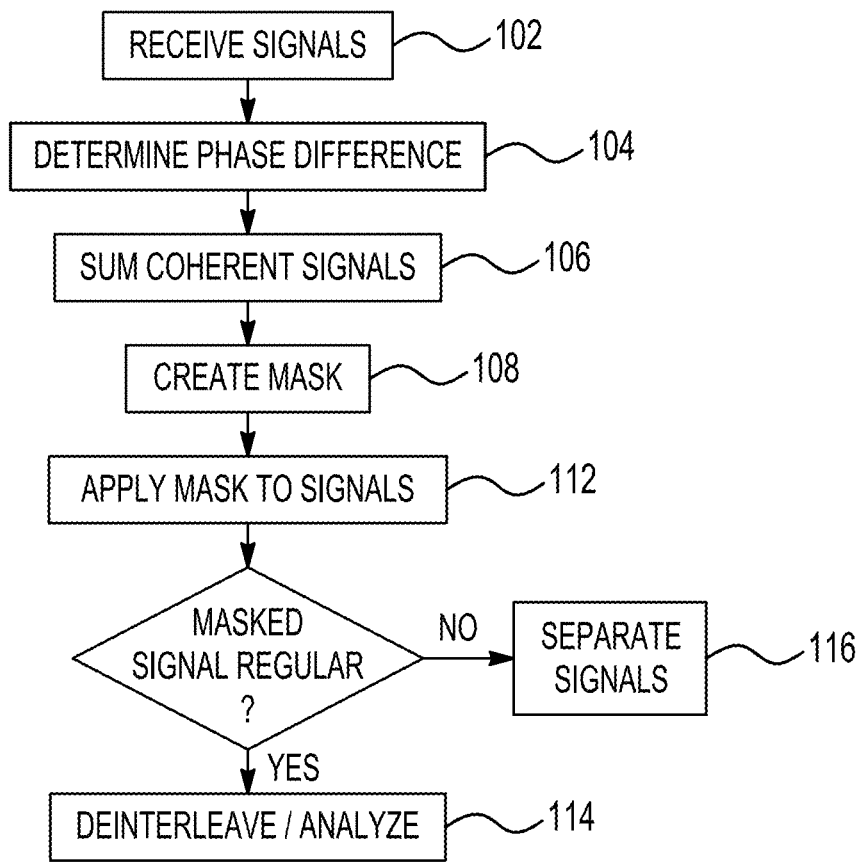
FIG. 2 is a high-level flow chart of steps in carrying out a method in accordance with an embodiment of the invention.

FIG. 2 shows a flow chart of a method 100 of processing signals received by the receivers 22 and 24, and FIGS. 3-6 illustrate steps that are part of that process.

In a first step 102 the RF signals 12 (FIG. 1) are received at the two receivers 22 and 24 (FIG. 1), and the data from the two receivers 22 and 24 is collected together for processing. The receivers 22 and 24 may include any of a variety of suitable antennas for receiving RF signals. The receivers 22 and 24 may be coupled together, as illustrated in FIG. 1, though the coupling may in whole or in part may be other than a hard-wired connection, for example by wireless communication between the receivers, in any of a variety of suitable forms for transferring data.

Figure 3:
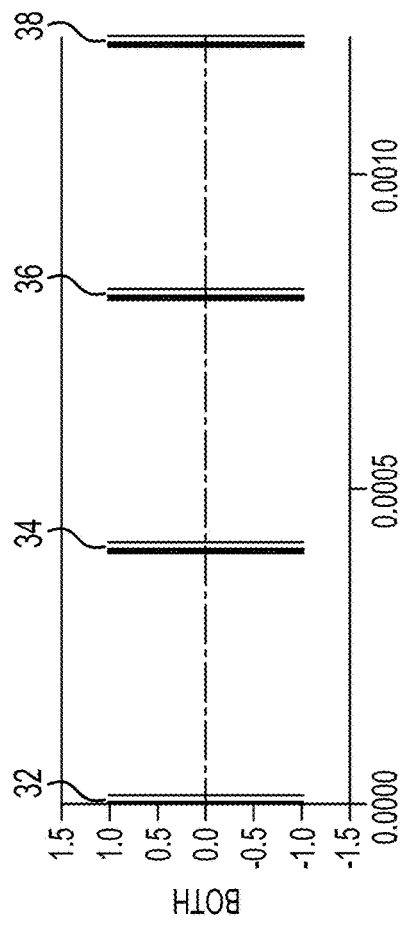
FIG. 3 is an illustration of a first step of the method of FIG. 2.

FIG. 3 illustrates this data acquisition process. The receivers 22 and 24 (FIG. 1) receive respective pairs of signal pulses 32, 34, 36, and 38 out of phase with each other, for example due to their different distances from the source 14 (FIG. 1). In each of pulse pairs 32-38 a signal is received at one of the receivers 22 and 24 before it is received at the other of the receivers.

Following the acquisition of the data, in step 104 the data is used to determine a phase difference between the signals received at the receivers 22 and 24 (FIG. 1). Using location of the receivers 22 and 24, such as from global positioning system (GPS) information for the receiver locations, a determination may also be made about the location of the source 14 (FIG. 1). The RF signal 12 (FIG. 1) emanates from an unknown location, r(x,y,z). The signal is received by two platforms or receivers 22 and 24 (aircraft, satellites, or other platforms) separated by some known distance, resulting in a phase difference between received signals. The platforms or receivers 22 and 24 each have accurate (GPS or better) knowledge of their own position, and a common time clock, to permit correlation of signal samples made by each platform's receiver.

These signals by the respective of the receivers (platforms) 22 and 24 can be viewed as complex signals:

$$S_1 = A_1 \exp{-j2\pi f_s t_1} \quad (1)$$

$$S_2 = A_2 \exp{-j2\pi f_s t_2} \quad (2)$$

Here $S_i$ denotes the complex signal as represented by the signal magnitude as received $A_i$ and the complex sampling at a sampling rate of $f_s$ and at oscillator clock time $t_i$, and j indicates the square root of −1. Adding these signals together:

$$S_1 + S_2 = (A_1 + A_2) \exp(-j2\pi f_s (t_1 - t_2)) \quad (3)$$

Here $t_1 - t_2$ may also be called the time different of arrival and creates a phase difference. Thus the signals sum imperfectly because they are not in phase with each other, because there is a time difference of arrival (TDOA) of the same signal between the two spatially-separated receivers 22 and 24.

The TDOA, the phase difference between signals received at the two receivers 22 and 24, may be determined through a correlation:

$$\Lambda(f, g)(t, \omega) := \int_{-\infty}^{\infty} f(\tau) \overline{g}(\tau - t) \exp(-j2\pi\tau\omega) d\tau \quad (4)$$

Here f denotes the original signal, and g denotes a signal with a time delay $t_d$ and a Doppler shift ω. For instance g may be represented as:

$$g = \exp(-j2\pi\omega_d t) f(t + t_d) \quad (5)$$

Equations (4) and (5) represent Stein's formulation of the Complex Ambiguity Function (CAF) which provides the basic correlation operation between two complex sampled signal trains such as $S_1$ and $S_2$. The CAF provides a means to compute the Time-Difference of Arrival (TDOA) and the Frequency Difference of Arrival (FDOA) of a signal received by a pair of receivers. Further details of this CAF approach may be found in, for example, Stein, S. (1981, June), Algorithms for Ambiguity Function Processing, *IEEE Transactions of Acoustics, Speech, and Signal Processing*, 29(3), 588-599.

The output of the correlation operations over multiple hypotheses of time-difference and frequency difference of arrival is a surface. Basic detection algorithms can be applied such as the z-score algorithm to determine the presence of a signal. Z-score represents a statistical test of the mean against the standard deviation to prove or disprove a hypothesis based on a mean value exceeding some number of standard deviations, such as 4.5 standard deviations. The detection peak in the TDOA-FDOA CAF plane determines the TDOA measurement. Similarly the FDOA determines a frequency shift due to motion.

Figure 4:
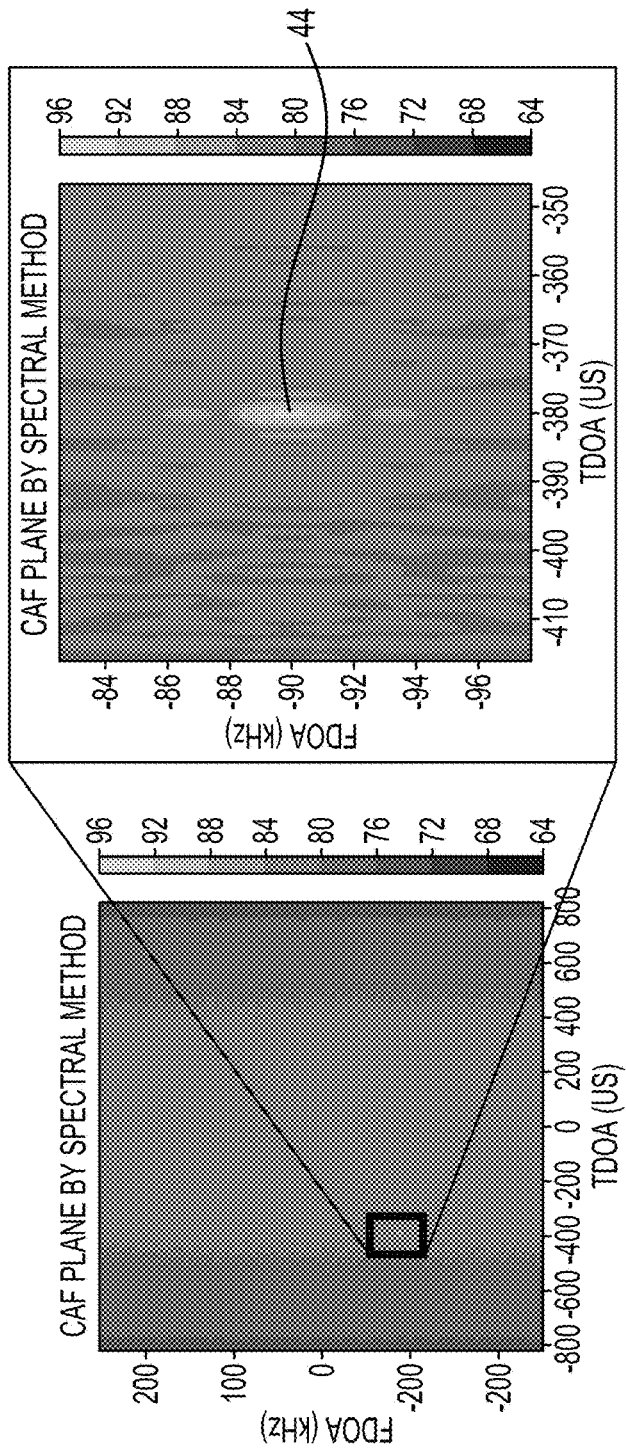
FIG. 4 is an illustration of a second step of the method of FIG. 2.

This CAF process is illustrated in FIG. 4, showing a sample plot of the correlation results of a CAF operation, plotting FDOA versus TDOA. A small part of the magnified portion of the figure shows up in a different color, denoted by reference number 44, indicating a correlation at that FDOA and TDOA, indicating that those are the FDOA and TDOA corresponding to the present situation in the signal processing.

Once the TDOA is determined it can be used as a phase adjustment Φ:

$$\Phi = \exp{-j2\pi f_s \tau_{TDOA}} \quad (6)$$

This may be applied to one of the two sets of samples received by the platforms (or receivers) 22 and 24 (FIG. 1), for example as:

$$S_1 = A_1 \exp{-j2\pi f_s t_1} \quad (7)$$

$$S_2' = A_2 \exp{-j2\pi f_s (t_2 - \tau_{TDOA})} \quad (8)$$

This aligns the two signal trains, received by the two receivers 22 and 24, such that signals with the same TDOA are in phase and therefore reinforce. Signals not part of the given (measured) TDOA attenuate.

Certain variants may be possible with regard to the above process and equations. Generally, however, a correlation-based approach will be used to determine TDOA, if signals have not been deinterleaved. The embodiment described above uses correlation in the form of the CAF plane to create separation of signals in terms of time (TDOA) and Doppler (FDOA) that are unique to a given emitter at an unknown location, but directly related to the TDOA and/or FDOA lines of position.

Figure 5:
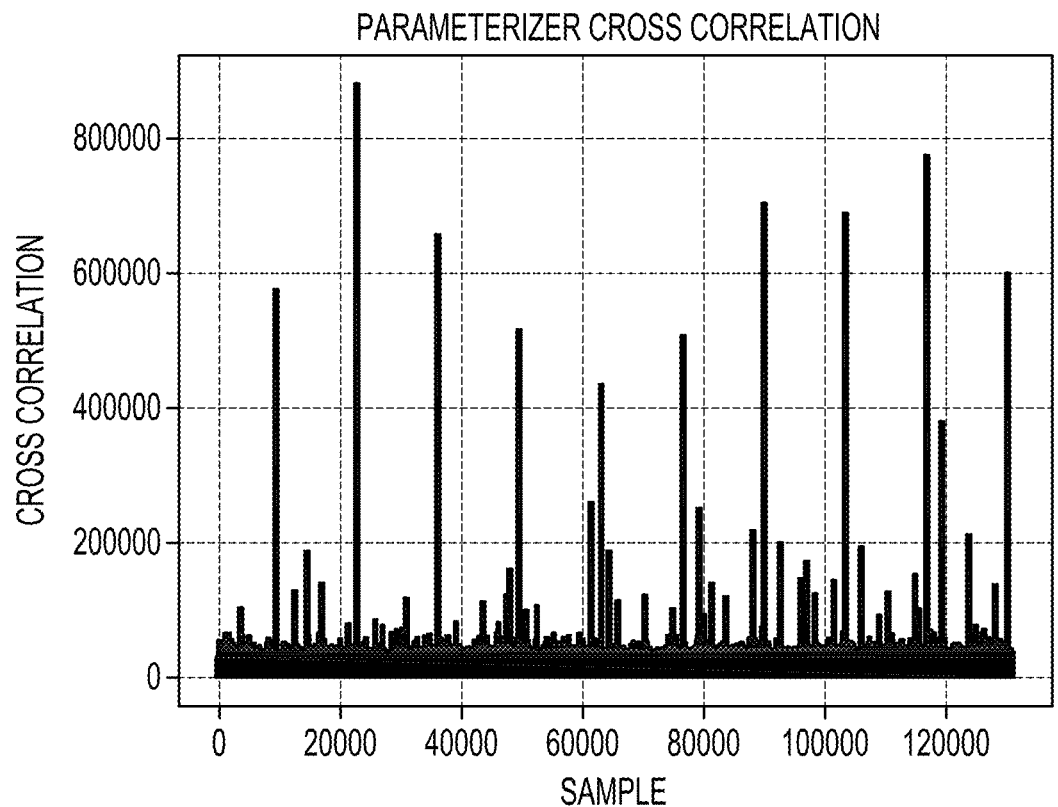
FIG. 5 is an illustration of a third step of the method of FIG. 2.

Next, in step 106, the modified signals (one signal being adjusted in phase, as described above, to bring the signals back into phase) are summed to take a coherent signal sum magnitude, $|S_1 + S_2'|$. This coherent summed signal magnitude is illustrated in FIG. 5, with the magnitude plotted for a series of samples.

Figure 6:
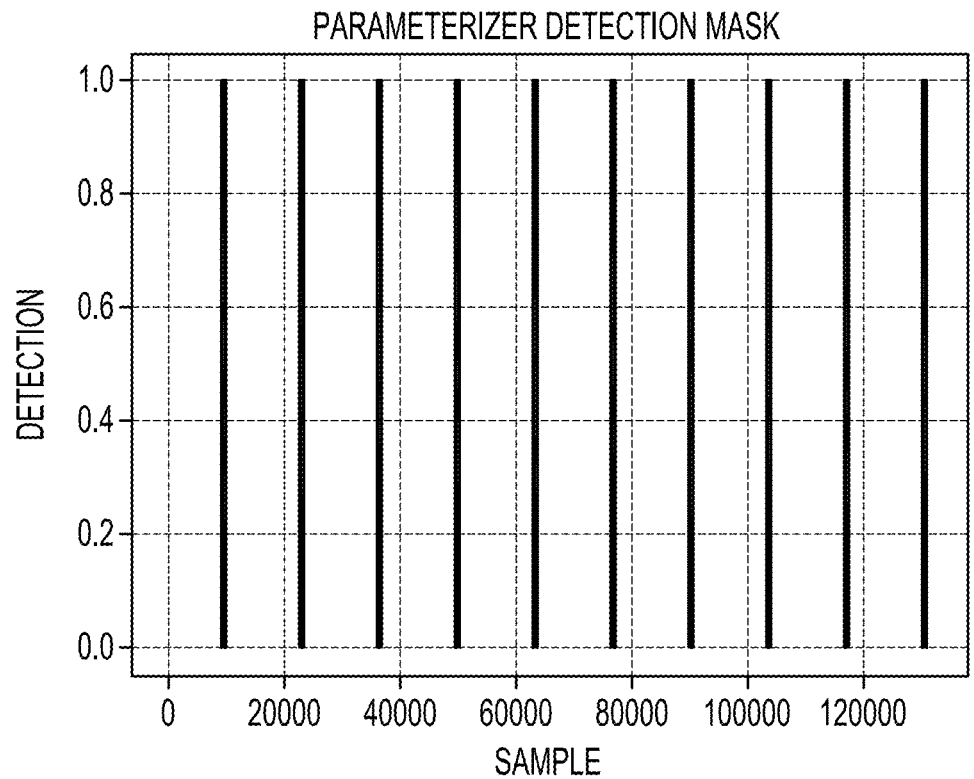
FIG. 6 is an illustration of a fourth step of the method of FIG. 2.

In step 108 a threshold is applied to the coherent summed signal shown in FIG. 5, to eliminate the low-level attenuated signals that fall below the threshold level. This may be considered as producing a blanking mask or filter to be applied to the coherent summed signal. The blanking mask M, for example, may provide a 1 multiplier for values above the threshold and a 0 multiplier for signal values below the threshold, for each sample in the signal train. This allows for isolation of only signal content in either of the two original signal trains, such as $S_1 ° M$ which means the mask is applied to the first receivers signal samples. Such a parameter detection or blanking mask is shown in FIG. 6.

This masking operation can in many cases be sufficient to provide the deinterleaving function for pulsed signal trains such as radar pulses. A case exists where multiple signals may be present at a given location and therefore share the same TDOA. In this case additional deinterleaving steps may be used to the signals, for example statistical clustering or the application of pulse repetition interval (PRI) algorithms. Examples of suitable additional steps may be found in Milojevic, D., & Popovic, B. (1992), Improved Algorithm for the Deinterleaving of Radar Pulses, *IEE Proceedings-F,* 139(1), 98-104; and Nishiguchi, K., & Kobayashi, M. (2000), Improved Algorithm for Estimating Pulse Repetition Intervals, *IEEE Transactions on Aerospace and Electronic Systems,* 36(2), 407-421.

Accordingly, in step 112 the blanking mask may be applied to each (or either) the signal trains received at the receivers 22 and 24 (FIG. 1) to blank out the non-coherent signal elements. It will be appreciated that this allows focusing on the characteristics of the RF signal 12 (FIG. 1) actually sent by the source 14 (FIG. 1). If the pulses are regularly spaced then the RF signal 12 (as received by the receivers 22 and 24) may be deinterleaved for further analysis in step 114. Another example of a prior effort at deinterleaving may be found in U.S. Pat. No. 6,985,102, "Method and System for Deinterleaving." Signal analysis of deinterleaved signals includes determination of pulse width, pulse repetition frequency, modulation on pulse, and modulation parameters, to name a few non-limiting examples. If the blanked (or filtered or masked) signals are irregular, then in step 116 further deinterleaving may be performed to separate the multiple signal streams remaining, such as in the case of multiple RF emitters at a singular location on the Earth. It will be appreciated that this process may be greatly aided by the spatial separateness of the receivers 22 and 24, and the resulting processing described above.

The method described above may be implemented in any of a variety of ways, for example as software executed on a processor or other device, and/or as hardware, such as a processor, field-programmable gate array (FPGA), integrated circuit, or the like.

As used herein, software includes but is not limited to, one or more computer or processor instructions that can be read, interpreted, compiled, and/or executed and that cause a computer, processor, or other electronic device to perform functions, actions or behave in a desired manner. The instructions may be embodied in various forms like routines, algorithms, modules, methods, threads, or programs including separate applications or code from dynamically or statically linked libraries. Software also may be implemented in a variety of executable or loadable forms including, but not limited to, a stand-alone program, a function call (local or remote), a servlet, and an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable or computer-executable instructions can be located in one logic or distributed between two or more communicating, co-operating, or parallel processing logics and thus can be loaded or executed in series, parallel, massively parallel and/or other manners.

In addition to the aforementioned description, in other embodiments, elements discussed in this specification may be implemented in a hardware circuit(s) or a combination of a hardware circuit(s) and a processor or control block of an integrated circuit executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a processor or control block executing code encoded in a computer readable media, or a combination of a hardware circuit(s) and a processor and/or control block executing such code.

Figure 7:
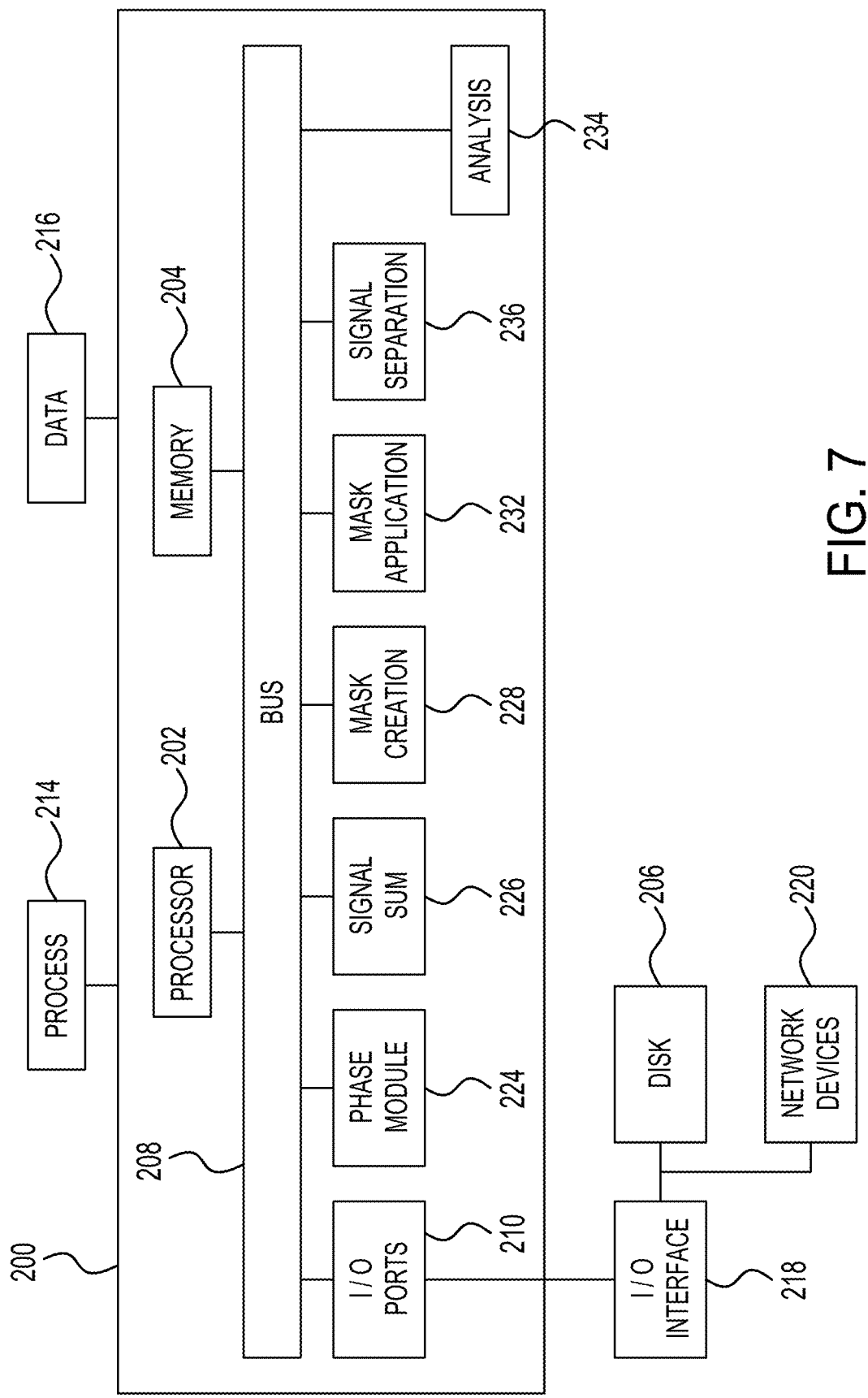
FIG. 7 is a block diagram of a machine/apparatus for carrying out the method of FIG. 2.

FIG. 7 illustrates a block diagram of an exemplary apparatus/machine 200 for carrying out the operations described in FIG. 2. The machine 200 includes a processor 202, a memory 204, and I/O Ports (or transmit/receive blocks) 210 operably connected by a bus 208. The machine 200 may be part of a system that includes the receivers 22 and 24 (FIG. 1).

In one example, the machine 200 may receive input signals including the wireless incoming signal, and/or date concerning signals, etc., via, for example, I/O Ports 210 or I/O Interfaces 218. The machine 200 may also include various modules for carrying out the method steps of the method 100 (FIG. 2), as described above. Such modules may include a phase determination module 224, a signal summing module 226, a mask creation module 228, a mask application module 232, a signal separation module 236, and a deinterleaving/analysis module 234, any or all of which may be implemented in machine 200 as hardware, firmware, software, or a combination thereof and, thus, the machine 200 and its components may provide means for performing functions described and/or claimed herein.

The processor 202 can be a variety of various processors including dual microprocessor and other multi-processor architectures. The memory 204 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 206 may be operably connected to the machine 200 via, for example, an I/O Interfaces (e.g., card, device) 218 and an I/O Ports 210. The disk 206 can include, but is not limited to, devices like a magnetic disk drive, a solid-state disk drive, a floppy disk drive, a tape drive, a Zip drive, a flash memory card, or a memory stick. Furthermore, the disk 206 can include optical drives like a CD-ROM, a CD recordable drive (CD-R drive), a CD rewriteable drive (CD-RW drive), or a digital video ROM drive (DVD ROM). The memory 204 can store processes 214 or data 216, for example. The disk 206 or memory 204 can store an operating system that controls and allocates resources of the machine 200.

The bus 208 can be a single internal bus interconnect architecture or other bus or mesh architectures. While a single bus is illustrated, it is to be appreciated that machine 200 may communicate with various devices, logics, and peripherals using other busses that are not illustrated (e.g., PCIE, SATA, Infiniband, 1394, USB, Ethernet). The bus 208 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The machine 200 may interact with input/output devices via I/O Interfaces 218 and I/O Ports 210. Input/output devices can include, but are not limited to, a keyboard, a microphone, a pointing and selection device, cameras, video cards, displays, disk 206, network devices 220, and the like.

The I/O Ports 210 can include but are not limited to, serial ports, parallel ports, and USB ports.

The machine 200 can operate in a network environment and thus may be connected to network devices 220 via the I/O Interfaces 218, or the I/O Ports 210. Through the network devices 220, the machine 200 may interact with a network. Through the network, the machine 200 may be logically connected to remote computers. The networks with which the machine 200 may interact include, but are not limited to, a local area network (LAN), a wide area network (WAN), and other networks. The network devices 220 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 220 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, or through a network may include combinations and mixtures of communications.

Although the process was described above in terms of a pair of receivers, it will be appreciated that more than two receivers may be employed. When more than two receivers are used the method described above may be applied to different pairs of receivers, with signals from the different pairs of receivers correlated and analyzed.

The performance of the method described may occur at the receivers 22 and/or 24 (FIG. 1), or partially or wholly at another location, such as a mobile vehicle or stationary facility where the processing is carried out. Steps of the method may be carried out all at the same location, or may be carried out at different locations and/or at different times.

The process shown in the figures and described above may be applied for use in processing and interpretation in any of a variety of signals. The source 14 (FIG. 1) may be any of a variety of sources, such as spacecraft, aircraft, missiles, or sea vehicles, such as ships or submarines. The signals may be related to military or non-military, commercial or non-commercial, and governmental or non-governmental sources. As one example, the process may be used to detect and process radar and/or electronic intelligence (ELINT) signals sent by fast-moving missiles or aircraft. As another example, the process may be used for detecting and interpreting radar signals from ships or boats that may be engaged in illegal operations, such as illegal fishing. Many and various other sorts of signals, not necessarily RF signals, may be detected and processed (analyzed) as described above.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of processing incoming wireless signals that include source signals from a source, the method comprising:
    receiving the incoming wireless signals at receivers at different spatial locations;
    correlating timing of receipt of the incoming wireless signals at the receivers; and
    coherently summing the wireless signals to produce a coherently summed signal, using results of the correlation;
    wherein the results of the correlation include a time difference of arrival (TDOA) between the incoming signals received at the receivers; and
    wherein the coherently summing includes shifting phase of at least one of the incoming signals, using the TDOA.

2. The method of claim 1, further comprising filtering the coherently summed signal.

3. The method of claim 2, wherein the filtering includes creating a blanking mask to attenuate portions of the coherently summed signal that are not of interest.

4. The method of claim 3, wherein the creating a blanking mask includes comparing portions of the coherently summed with a predetermined threshold magnitude.

5. The method of claim 3, further comprising applying the blanking mask to the signals received at the receivers, to create blanked signals that attenuate portions not of interest.

6. The method of claim 5, further comprising analyzing the blanked signals.

7. The method of claim 6, wherein the further analyzing includes deinterleaving the blanked signals to separate signal streams.

8. The method of claim 1, wherein the receiving includes receiving the incoming signals, with the receivers spatially separated by at least 1 km.

9. The method of claim 1, wherein the receiving includes receiving the incoming signals, with the receivers spatially separated by between 1 km and 250 km.

10. The method of claim 1, wherein one of the receivers is on a movable platform.

11. The method of claim 1, wherein one of the receivers is on a flying vehicle.

12. The method of claim 1, wherein the correlating includes applying a complex ambiguity function to the incoming signals to determine TDOA for phase adjustment.

13. The method of claim 1, further comprising geolocating the source using the incoming signals.

14. The method of claim 1, wherein the shifting phase of at least one of the incoming signals includes attenuating signals not at the measured TDOA.

15. An apparatus for processing received signals, comprising:
    at least one processor configured to:
        receive signal information from a plurality of receivers located at different spatial locations, the signal information including signals received at the plurality of receivers from a source and timing of receipt of the signals at the plurality of receivers;
        correlate the timing of receipt of the signals at the plurality of receivers; and coherently sum the signals to produce a coherently summed signal based on the results of the correlation; and a memory coupled to the at least one processor;

wherein the results of the correlation include a time difference of arrival (TDOA) between the signals at the receivers; and wherein the at least one processor is configured to shift phase of at least one of the signals using the TDOA as part of coherently summing the signals.

16. The apparatus of claim 15, wherein the at least one processor is further configured to filter the coherently summed signal.

17. The apparatus of claim 16, wherein the at least one processor is configured to create a blanking mask to attenuate portions of the coherently summed signal that are not of interest as part of filtering the coherently summed signal.

18. The apparatus of claim 17, wherein the at least one processor is further configured to compare portions of the coherently summed with a predetermined threshold magnitude as part of creating the blanking mask.

19. A system for processing received signals, comprising:

a plurality of receivers located at different spatial locations, the plurality of receivers being configured to receive the signals from a source; and at least one processor configured to:

correlate the timing of receipt of the signals at the plurality of receivers; and coherently sum the signals to produce a coherently summed signal based on the results of the correlations;

wherein the results of the correlation include a time difference of arrival (TDOA) between the incoming signals received at the receivers; and wherein the coherently summing includes shifting phase of at least one of the incoming signals, using the TDOA.

* * * * *